(12) United States Patent
Savolainen et al.

(10) Patent No.: US 6,671,958 B2
(45) Date of Patent: Jan. 6, 2004

(54) METHOD FOR PRODUCING A ROLL FOR A PAPER/BOARDMAKING MACHINE

(75) Inventors: Eero Savolainen, Jyväskylä (FI); Jorma Snellman, Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 34 days.

(21) Appl. No.: 09/965,065

(22) Filed: Sep. 27, 2001

(65) Prior Publication Data

US 2002/0088895 A1 Jul. 11, 2002

Related U.S. Application Data

(63) Continuation of application No. PCT/FI00/00265, filed on Mar. 29, 2000.

(30) Foreign Application Priority Data

Mar. 30, 1999 (FI) .................................................. 990702

(51) Int. Cl.[7] ................................................. B21K 1/02
(52) U.S. Cl. .................. 29/895.32; 29/895.3; 29/527.3; 492/56; 492/59
(58) Field of Search ............................... 492/56, 28, 37, 492/59, 48; 29/895.3, 895.32, 407.05, 527.3, 527.2, 557

(56) References Cited

U.S. PATENT DOCUMENTS

| | | | | |
|---|---|---|---|---|
| 3,877,919 A | * | 4/1975 | Shorr | 492/52 |
| 4,065,841 A | * | 1/1978 | Gysin | 492/37 |
| 4,368,568 A | | 1/1983 | Watanabe | |
| 4,705,711 A | * | 11/1987 | Perna | 29/DIG. 23 |
| 4,903,597 A | * | 2/1990 | Hoage et al. | 492/4 |
| 4,925,014 A | * | 5/1990 | Haite | 198/780 |
| 5,713,408 A | * | 2/1998 | Morando | 29/895.72 |
| 5,857,950 A | * | 1/1999 | Hycner | 492/30 |
| 5,895,689 A | * | 4/1999 | Gajewski | 492/56 |
| 6,095,957 A | * | 8/2000 | Ichino et al. | 492/54 |
| 6,158,340 A | * | 12/2000 | Venturati | 492/58 |
| 6,253,671 B1 | * | 7/2001 | Kayser | 492/59 |
| 6,406,784 B1 | * | 6/2002 | Cerrah | 492/56 |

FOREIGN PATENT DOCUMENTS

| | | |
|---|---|---|
| JP | 60-129417 | 7/1985 |
| WO | WO 95/33143 | 12/1995 |
| WO | WO 00/58638 | 10/2000 |

* cited by examiner

*Primary Examiner*—Gregory Vidovich
*Assistant Examiner*—Marc Jimenez
(74) *Attorney, Agent, or Firm*—Stiennon & Stiennon

(57) ABSTRACT

A roll for a paper or board machine is produced by forming a tubular roll blank by bending out of a planar sheet or by means of centrifugal casting. The roll blank is first coated with a material having a modulus of elasticity and a density lower than those of steel and the coated roll blank is turned on a lathe to a desired shape and to a desired surface quality.

9 Claims, 4 Drawing Sheets

METHOD FOR PRODUCING A ROLL FOR A PAPER/BOARDMAKING MACHINE

CROSS REFERENCES TO RELATED APPLICATIONS

This application is a continuation of PCT/FI00/00265 filed Mar. 29, 2000, and claims priority on Finnish Application No. 990702, filed Mar. 30, 1999, the disclosures of both of which applications are incorporated by reference herein.

STATEMENT AS TO RIGHTS TO INVENTIONS MADE UNDER FEDERALLY SPONSORED RESEARCH AND DEVELOPMENT

BACKGROUND OF THE INVENTION

The invention relates to a method for producing a roll for a paper or board machine, and to the roll so produced.

As known from the prior art, some of the rolls in papermaking machines are made out of shell blanks by bending sheets, then after bending of the sheets the outer surface of the shell is turned on a lathe, in which connection the errors in shape caused by manufacturing inaccuracies are passed to variations in wall thickness, wherefore there arise variations in the stiffness of the shell and eccentricity of the centre of gravity of the shell with respect to its centre of rotation. The unbalance caused by the eccentricity of the centre of gravity may be minimized in the blank by proper centering and by balancing of the shell, but it is difficult to correct the stiffness variations later on. Turning causes errors in the roundness and straightness of the roll also because the blank has residual stresses and/or because the thickness of chips during machining varies. The variation of roll stiffness produces so-called semicritical vibration at a speed which is half of the critical speed of the roll. Unbalance in turn causes vibrations at all speeds.

SUMMARY OF THE INVENTION

It is an object of the invention to propose a solution to the above-mentioned problems.

In accordance with the invention, the variation of the stiffness of the shell and its need for balancing are substantially reduced because the shell body is not turned on a lathe, but, instead, after a roll blank has been produced out of a sheet by bending, the shell is first covered by a coating and turned only after this. In that connection, the errors in shape are passed to the coating as thickness variation and, as the modulus of elasticity and the density of the coating are lower than those of steel, both the variation of the stiffness and the unbalance of the shell are substantially reduced. As the coating is used, for example, in a dryer section a material that withstands high-temperature conditions. The coating is selected such as to have a low stiffness and a low density, i.e. the density and the modulus of elasticity are low. The invention can be applied to roll blanks made of planar sheets by bending as well as in connection with centrifugally cast rolls.

In accordance with the invention, the thickness of the wall is measured and its shape is determined accordingly such that the difference in stiffness is as low as possible.

The coating can be applied to the surface of the roll by rotational casting or by vulcanizing, after which the roll is machined to a desired shape and to a desired surface quality.

The invention is most suitable for use in connection with guide rolls and nip rolls having a low nip load, such as, for example, a reeling drum.

By means of the invention, improved quality and cost savings are achieved.

In the following, the invention is described in greater detail, and the benefits of the invention are also described with reference to the accompanying drawings, to the details of which the invention is, however, by no means intended to be narrowly confined.

DESCRIPTION OF THE PREFERRED EMBODIMENTS

In accordance with the invention, a roll shell is bent out of a sheet blank into tubular form and its longitudinal seam is welded, and after that the shape of the tubular roll blank is measured and corrected, when needed, such that the difference in stiffness is as small as possible. After that, the roll is coated by providing, for example, by rotational casting or vulcanizing, the surface of the roll with a coating the density and the modulus of elasticity of which are considerably lower than the corresponding values of steel. The coating is machined to a desired shape and to a desired surface quality, after which the roll is ready for use and its stiffness difference and eccentricity of the centre of gravity are substantially smaller than those of a roll produced by means of known methods, as will be clear from the following series of figures and, moreover, the difference in principal inertias as a function of the diameter and the wall thickness of the roll is small.

The modulus of elasticity of the coating is 10–5000 MPa, preferably 10–4000 MPa, and its density is 0.9–3 g/cm$^3$, preferably 0.9–1.5 g/cm$^3$. The coating material is, for example, polyurethane, ebonite or an epoxy composite.

Figure 1A:
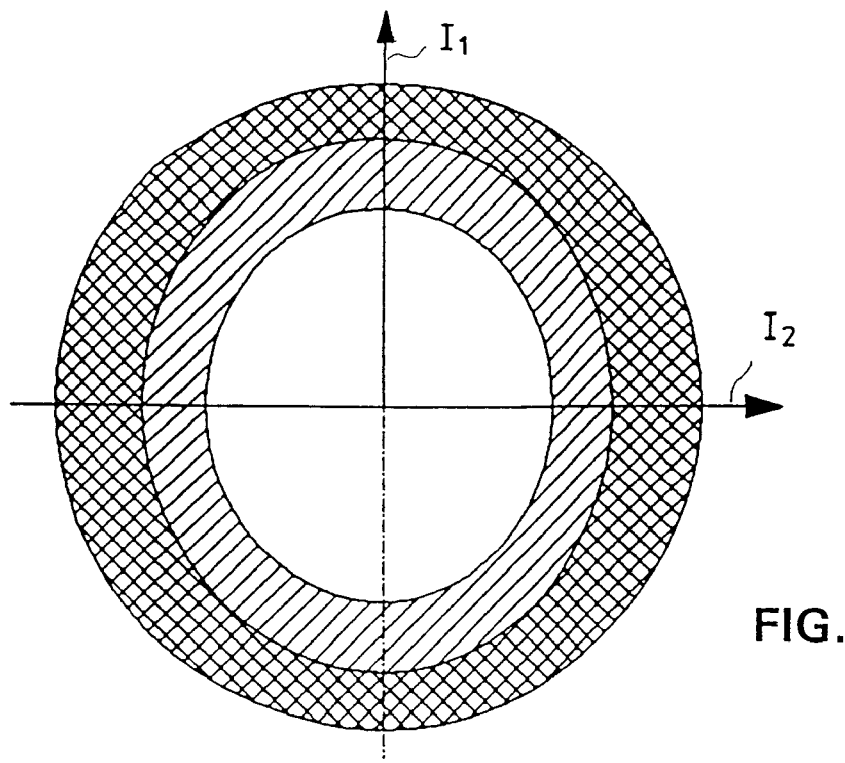
FIGS. 1A and 1B show a schematic comparison of differences in stiffness of a roll according to the invention and a roll produced by turning.
Figure 1B:
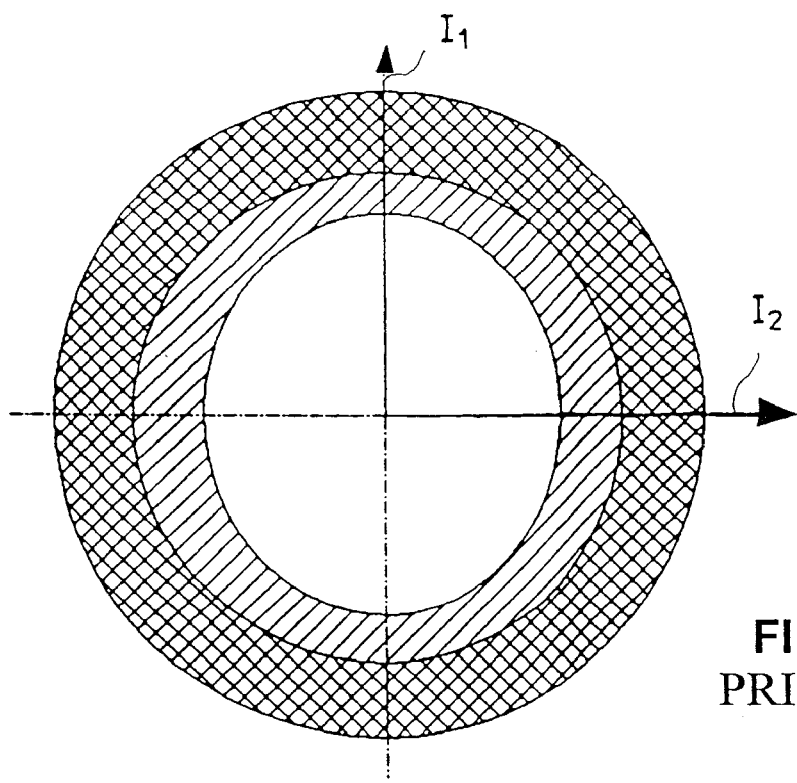

FIGS. 1A and 1B show a comparison of the differences in stiffness of a roll produced in accordance with the invention and a roll produced by turning when the out-of-roundness of the blank is 1 mm. FIG. 1A shows a roll produced according to the invention, wherein $\Delta I$ is 0.2%, $\Delta I$ is $I_1-I_2/I_2 \cdot 100\%$, and $I_2$ is on the horizontal axis and $I_1$ is on the vertical axis. In the case shown in FIG. 1B, $\Delta I$ is 0.61%. In the comparison, the diameter of the roll was 800 mm and the thickness of the wall was 35 mm. As seen in the figures, the difference in stiffness $\Delta I$ of the roll produced according to the invention is clearly smaller.

Figure 2A:
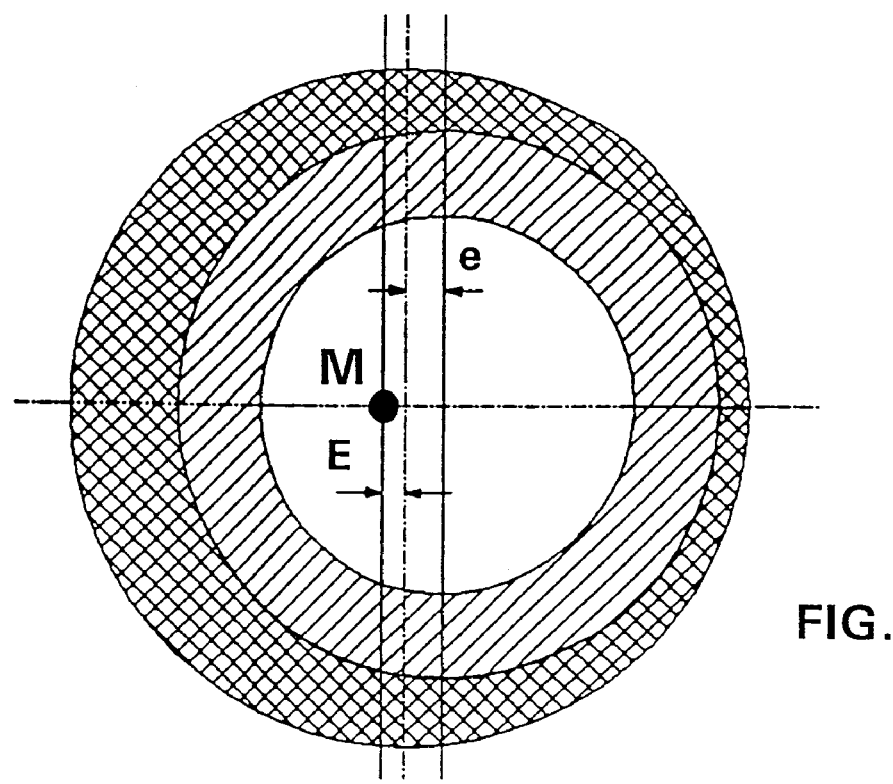
FIGS. 2A and 2B show a schematic comparison relating to the eccentricity of the centre of gravity when using a roll according to the invention as compared with a roll produced by turning.
Figure 2B:
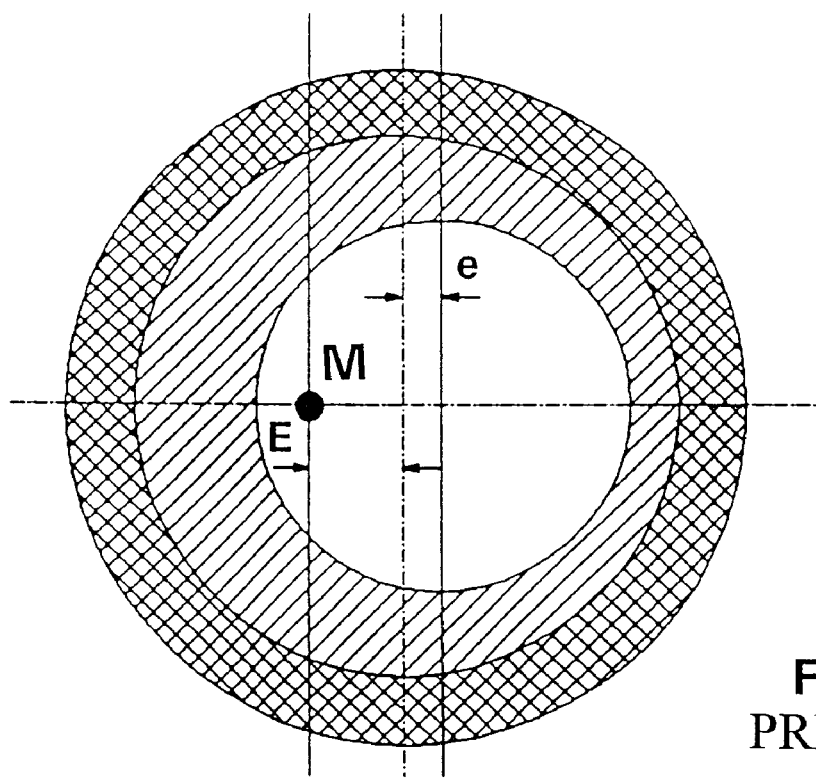

FIGS. 2A and 2B show a comparison concerning the eccentricity of the centre of gravity when using the method according to the invention and a roll produced according to it or when using a roll made by turning, as known in prior art. In FIG. 2A, the eccentricity E of the centre of gravity= 0.21 mm and, in FIG. 2B, the eccentricity E of the centre of gravity=4.83 mm. In the comparison used, the outside diameter $D_u$ of the roll=810 mm, the inside diameter D of the roll=800 mm, the thickness s of the wall of the roll=35 mm, and the eccentricity e of the blank=1.0 mm. As seen in the figures, the eccentricity of the centre of gravity of the roll according to the invention is clearly smaller.

Figure 3A:
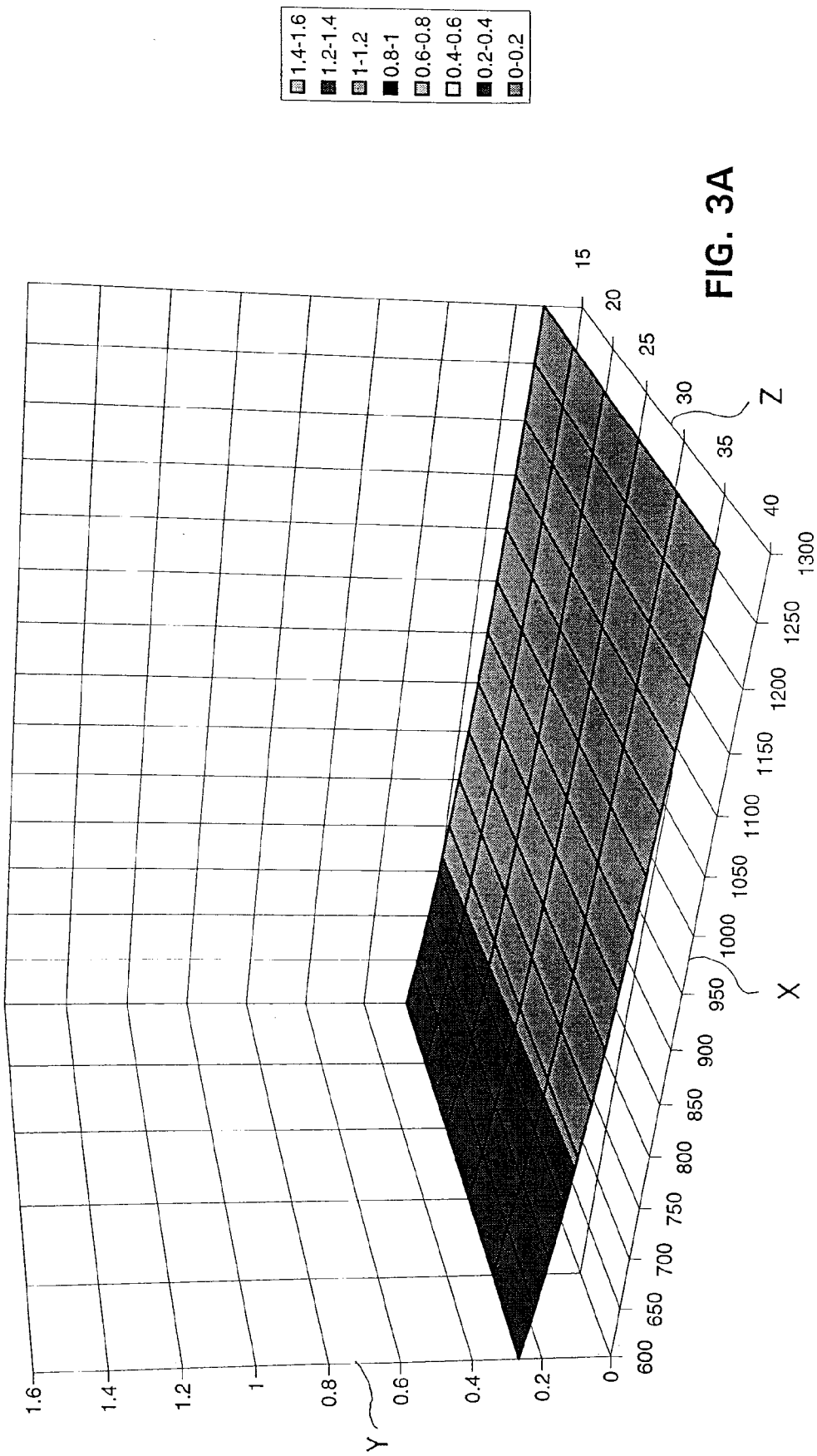
FIGS. 3A and 3B show a schematic comparison of the principal inertias of a roll made according to the invention and a roll produced by turning.
Figure 3B:
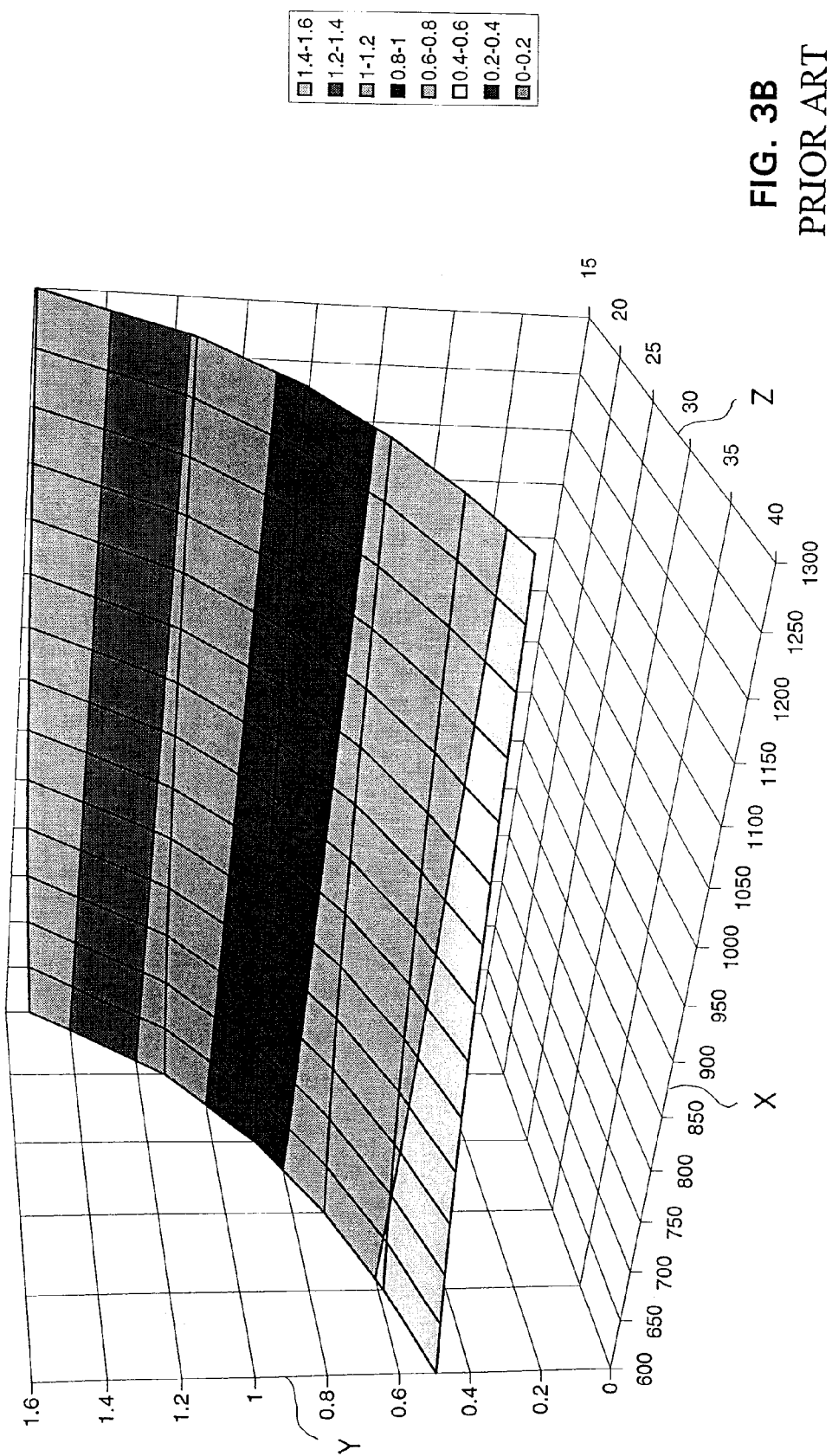

FIGS. 3A and 3B schematically show the difference of principal inertias as a function of the diameter and the wall thickness of the roll when the out-of-roundness of the inside bore is 1 mm and the difference in percent (%) of the principal inertias is on the Y-axis, the diameter of the roll in millimeters (mm) is on the horizontal axis and the thickness of the wall of the roll in millimeters (mm) is on the Z-axis. FIG. 3A shows the values for a roll produced according to the invention and FIG. 3B shows the values for a roll made by turning it on the outside as known in prior art. Considerably smaller differences are attained for the roll according to the invention.

As is evident from the series of figures described above, the technique according to the invention provides substantial advantages in the balance and stiffness asymmetry of the roll over the prior art arrangements.

Above, the invention has been described only with reference to some of its preferred embodiments, to the details of which the invention is, however, not by any means intended to be narrowly confined.

We claim:

1. A method for producing a roll for a paper or board machine, in which method a tubular roll blank is made by bending out of a planar sheet or by means of centrifugal casting,
   wherein wall thickness of the roll blank is measured during rotation of the roll blank in order to determine the shape of the outer surface, differences in stiffness of the tubular roll blank in planes passing through an axis defined by the tubular roll blank are calculated, and a shape required for balancing stiffness is determined and the shape is corrected with respect to stiffness to minimize differences in stiffness without turning the tubular roll blank,
   wherein the roll blank is then coated with a material that has a modulus of elasticity and a density lower than those of steel, and that the coated roll blank is turned on a lathe to a desired shape, by removing only the material that has an elasticity and a density lower than those of steel and the coated roll blank is turned on a lathe to a desired surface quality, whereby errors in shape of the tubular roll blank are passed to the coating as thickness variation.

2. The method of claim 1 wherein the roll blank is coated by rotational casting or by vulcanizing.

3. A method for producing a roll for a paper machine comprising steps of:
   making a tubular roll blank by bending a planar sheet or by centrifugal casting, the roll blank having an out-of-roundness of a particular amount;
   measuring variation in wall thickness of the body shell causing differences in stiffness and compensating for the differences in stiffness by correcting the shape of the roll blank without turning on a lathe;
   applying a coating to the roll blank with the out-of-roundness of said particular amount, after correcting the shape of the roll blank without turning on a lathe, the coating being a material that has a modulus of elasticity and a density lower than those of steel; and
   after coating the roll blank, turning the coated roll blank on a lathe to a desired shape and to a desired surface quality, wherein only the coating is removed in the turning, wherein the out-of-roundness of the roll blank is overcome by variations in thickness of the coating.

4. The method of claim 3 wherein the step of applying the coating comprises the step of rotational casting or vulcanizing.

5. A method for producing a roll used in a paper or board machine, comprising the steps of
   bending a planar sheet of steel to form a roll shell, having a longitudinal seam;
   welding the longitudinal seam of the roll shell to form a tubular roll blank which defines an axis and having an outer cylindrical surface;
   measuring the thickness of the tubular roll blank during rotation of the tubular roll blank;
   correcting the shape of the tubular roll blank, without turning on a lathe the tubular roll blank, such that the variations in stiffness of the tubular roll blank in planes passing through the defined axis is minimized;
   coating the outer cylindrical surface of the tubular roll blank with a coating material that has a modulus of elasticity which is considerably lower than that of steel and a density which is considerably lower than that of steel, to form a coated tubular roll blank;
   turning the coated tubular roll blank with coated outer cylindrical surface, so only said coating material is removed, producing a selected shape, and a selected surface quality, wherein the turning process produces variation in the thickness only of the coating material and not in the tubular roll blank; and
   using the turned coated tubular roll blank in a paper or board machine.

6. The method of claim 5 wherein the roll blank is coated by rotational casting or by vulcanizing.

7. The method of claim 5 wherein the coating material is selected from the group consisting of polyurethane, ebonite or an epoxy composite.

8. The method of claim 5 wherein the modulus of elasticity of the coating material is 10–4000 MPa.

9. The method of claim 5 wherein the density of the coating material is 0.9–1.5 g/cm$^3$.

* * * * *